Nov. 19, 1929.  N. STRAUSSLER  1,735,984
MOTOR VEHICLE
Filed April 6, 1929   3 Sheets-Sheet 2
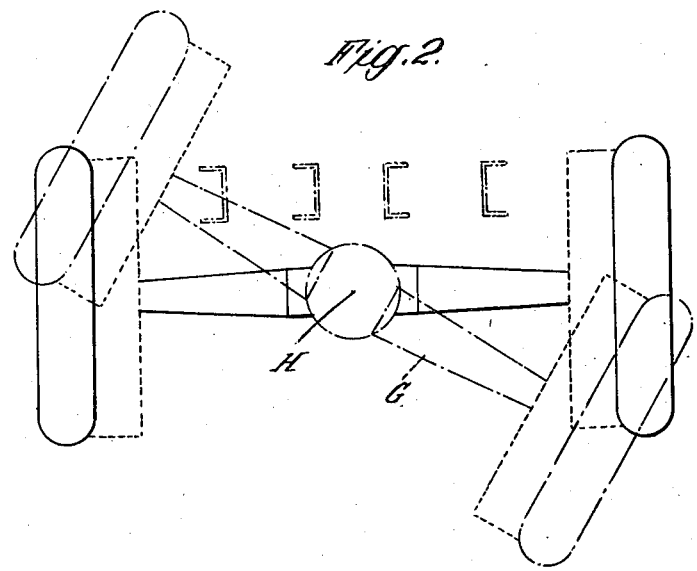
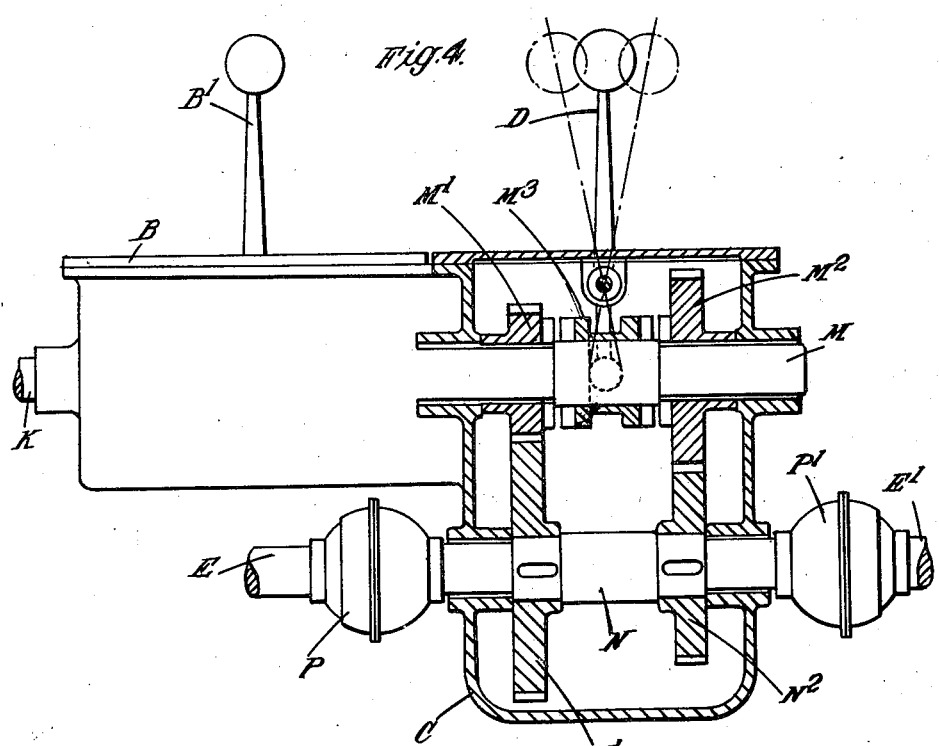

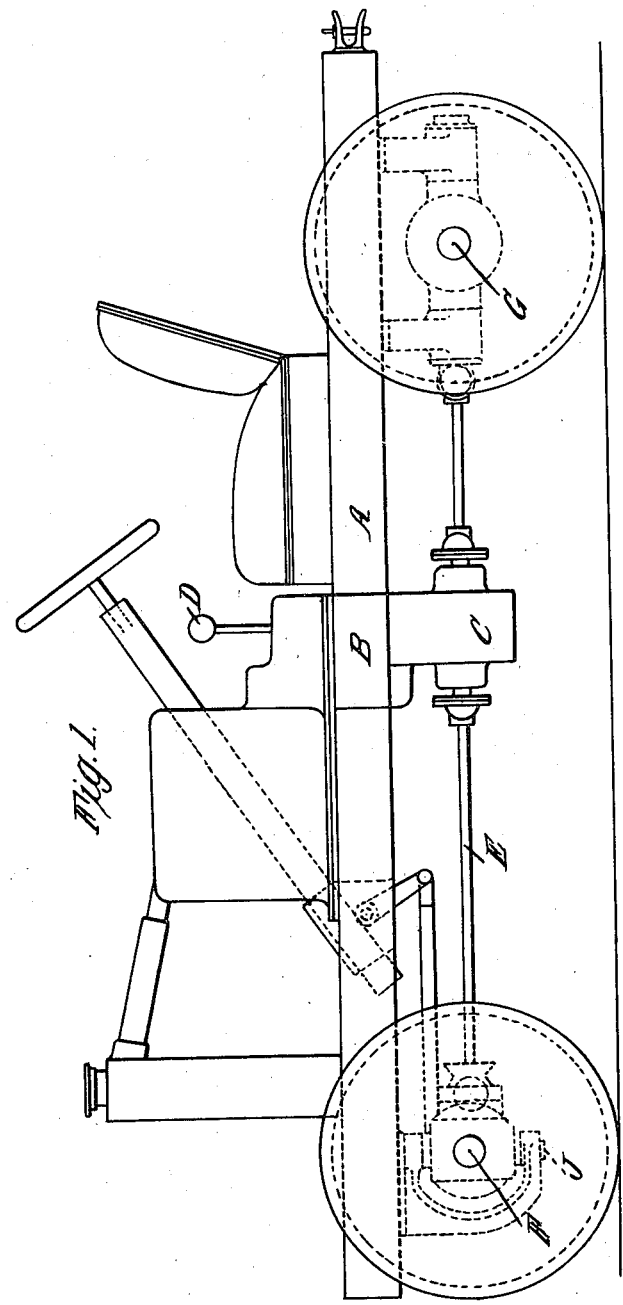

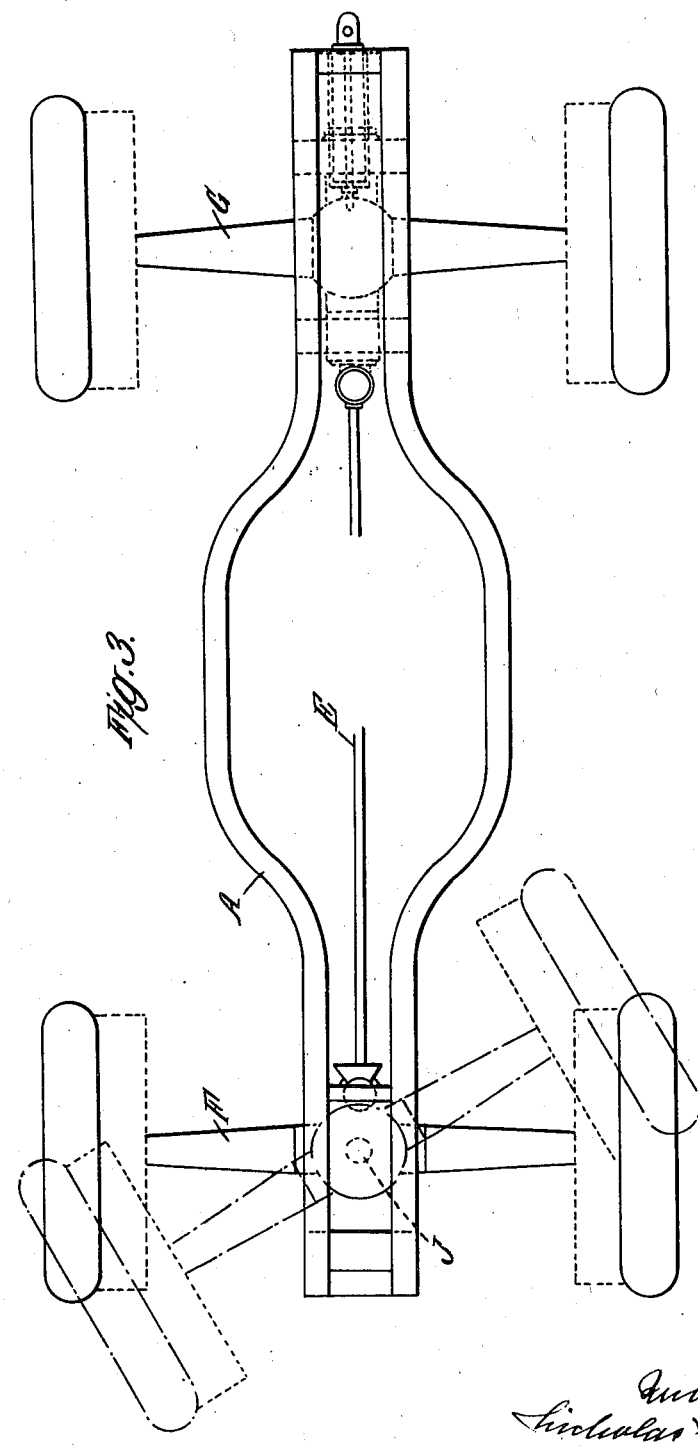

Patented Nov. 19, 1929

1,735,984

UNITED STATES PATENT OFFICE

NICHOLAS STRAUSSLER, OF LONDON, ENGLAND

MOTOR VEHICLE

Application filed April 6, 1929, Serial No. 353,205, and in Great Britain November 14, 1927.

This invention relates to motor vehicles of the kind having four road wheels, all of which are driven simultaneously from the engine, and it relates more particularly to motor tractors.

The chief object of the invention is to render a vehicle of this kind more adaptable for use on ground having an undulating surface, and on ground having different degrees of hardness, and this object is attained partly by the improved system of pivoting the wheel axles hereinafter described, partly by the combination with this system of wheels provided with spikes, teeth, or "grousers" adapted to be protruded and retracted in unison as fully described and illustrated in my concurrent application for Patent No. 318,480 and partly by providing convenient means whereby the speed at which the vehicle wheels are driven can be controlled and varied.

The back axle is mounted on a horizontal pivot so that it can tilt in a vertical plane, the front axle being adapted to turn about a vertical pivot so that for steering by the front wheels it swings in a horizontal plane, the pivotal centres in both the front and back axles cutting the centres of the axes about which the axles rotate. Thus all four wheels are kept in contact with the ground, however uneven the ground may be, and the axes of the two front wheels remain in the same plane (whether horizontal or inclined) with the centre of the back axle. This results from the aforesaid location of the pivotal centres of the "live" axles. Both the front and back axles are driven by a longitudinal shaft running under the engine and extending practically from end to end of the chassis or body of the vehicle. The shaft of the engine gear box, which usually gives three forward speeds and one reverse, is extended into a supplementary gear box in which are provided gear wheels or chain pulleys controlled by suitable clutches for transmitting the drive from the engine at either of two speed ratios to the aforesaid longitudinal shaft, the speed control being thus multiplied to give the choice of six forward and two reverse speeds.

In the accompanying drawings:—

Figure 1 is a diagrammatical side elevation of a motor vehicle embodying this invention.

Figure 2 represents the back wheels in rear elevation.

Figure 3 represents the chassis and wheels in plan.

Figure 4 represents in section the supplementary gear box.

A indicates the chassis, B the ordinary gear box, C the gear box extension in which are supplementary gears controlled by a clutch lever D and transmitting the drive to a longitudinal shaft E which in turn drives both the front axle F and the back axle G through suitable universal joints or bevel gearing. The back axle is mounted on a horizontal pivot at H so that it can tilt in a vertical plane as indicated in dotted lines in Figure 2, and the front axle is adapted to turn about a vertical pivot at J so that for steering by the front wheels it swings in a horizontal plane as indicated in dotted lines in Figure 3.

Referring to Figure 4, K indicates the shaft by means of which the drive from the engine is transmitted to the conventional gear box B controlled by the lever $B^1$, and M an extension shaft on which are gear wheels $M^1$, $M^2$. A sliding dog clutch $M^3$ controlled by the lever D is adapted to place either one of these wheels in driving connection with the shaft M to be driven thereby. The wheel $M^1$ is in gear with a larger wheel $N^1$ on a countershaft N, and the wheel $M^2$ is in gear with another wheel $N^2$ of equal size on the said countershaft. From the countershaft the drive is transmitted through a universal joint at P to the part of the longitudinal shaft E driving the front axle, while the drive is transmitted through a universal joint at $P^1$ to the part $E^1$ of the longitudinal shaft which drives the real axle. Thus when the clutch $M^3$ is operated to connect the wheel $M^2$ with the shaft M, the speed of the drive to the road wheels as regulated by the lever $B^1$ is unchanged, but when the said clutch connects the wheel $M^1$ with the shaft M, the speed of the drive is proportionately reduced in accordance with the ratio of the pitch circles of the wheels $M^1$ and $N^1$.

What I claim and desire to secure by Letters Patent of the United States is:—

In a motor vehicle, a transmission, an auxiliary shaft in alignment with said transmission and driven therefrom, a gear box enclosing said auxiliary shaft, a longitudinal shaft comprising a central counter-shaft and oppositely extending drive shaft sections, said counter-shaft extending through the gear box in parallel relation to said auxiliary shaft, change speed gears rotatable on said auiliary shaft, clutch means splined on said auxiliary shaft to alternately engage the gears therewith, gears splined on said counter-shaft meshing with said change speed gears, front and rear drive axles, said front axle pivoted to swing about a vertical axis, said rear axle pivoted to swing about a horizontal axis, the pivotal centers of said axles cutting the centers of the axis about which the wheels rotate, said longitudinal shaft sections drivably engaging said axles in the planes of their axes.

NICHOLAS STRAUSSLER.